United States Patent
Monahan et al.

(10) Patent No.: US 11,739,843 B2
(45) Date of Patent: Aug. 29, 2023

(54) BEARING EXTRACTION FROM A STUFFING BOX OF A ROTARY MECHANICAL DEVICE

(71) Applicant: SEAL-RYT CORP., Westfield, MA (US)

(72) Inventors: Thomas B. Monahan, Springfield, MA (US); Michael F. Huard, Easthampton, MA (US)

(73) Assignee: SEAL-RYT CORP., Westfield, MA (US)

( * ) Notice: Subject to any disclaimer, the term of this patent is extended or adjusted under 35 U.S.C. 154(b) by 400 days.

(21) Appl. No.: 16/809,461

(22) Filed: Mar. 4, 2020

(65) Prior Publication Data

US 2021/0277956 A1    Sep. 9, 2021

(51) Int. Cl.
   *F16J 15/18*       (2006.01)
   *B66F 3/08*        (2006.01)

(52) U.S. Cl.
   CPC .......... *F16J 15/189* (2013.01); *F16J 15/183* (2013.01); *B66F 3/08* (2013.01)

(58) Field of Classification Search
   CPC .......... F16J 15/18; F16J 15/183; F16J 15/189; F16C 33/74; F16B 37/125; B66F 3/08
   See application file for complete search history.

(56) References Cited

U.S. PATENT DOCUMENTS

| | | | |
|---|---|---|---|
| 2,140,304 A | 12/1938 | Wishart | |
| 2,295,490 A | 9/1942 | Sandherr | |
| 4,289,317 A | 9/1981 | Kuc | |
| 4,498,207 A | 2/1985 | Heinz | |
| 4,878,677 A * | 11/1989 | Larkins | F16J 15/183 366/331 |
| 6,834,862 B2 | 12/2004 | Wilkinson | |
| 10,072,758 B2 * | 9/2018 | Getto | F16J 15/183 |
| 10,697,544 B2 * | 6/2020 | Getto | F16J 15/40 |
| 10,760,685 B2 * | 9/2020 | Iehl | F16J 15/18 |
| D944,875 S * | 3/2022 | Monahan | D15/143 |
| D944,876 S * | 3/2022 | Monahan | D15/143 |
| 2017/0130729 A1 * | 5/2017 | Getto | F04D 29/049 |
| 2018/0100583 A1 * | 4/2018 | Iehl | F16J 15/18 |
| 2018/0363779 A1 | 12/2018 | Getto et al. | |
| 2020/0400141 A1 * | 12/2020 | Iehl | F16J 15/184 |
| 2022/0074497 A1 * | 3/2022 | Monahan | F16J 15/184 |
| 2022/0341460 A1 * | 10/2022 | Rowley | F16B 37/125 |

* cited by examiner

*Primary Examiner* — Nicholas L Foster
(74) *Attorney, Agent, or Firm* — Michael I. Wolfson

(57) ABSTRACT

An improved bearing or bushing body extraction from a stuffing box using jack screws is provided. The bearing or bushing seal body includes at least one jack screw on each half of a split body. The jack screw passes axially through the sidewall of the body to the inner flange of the stuffing box and turning the jack screw against the inner flange to lift the body from the stuffing box. A single inner threaded or double threaded insert with a reverse outer thread and standard inner thread is inserted into the bottom wall of the body so that the body may be installed flush against the inner flange. By turning the jack screw through the insert and against the flange, the seal body is pushed out rather than pulled.

14 Claims, 7 Drawing Sheets

BEARING EXTRACTION FROM A STUFFING BOX OF A ROTARY MECHANICAL DEVICE

BACKGROUND OF THE INVENTION

This invention relates to extraction of a bearing or bushing seal body from a stuffing box in a rotary mechanical device, and more particularly to providing at least one jack screw that passes axially through the sidewall of the body to the inner flange of the stuffing box to allow for easy removal of the body from the stuffing box.

Rotary mechanical devices, such as mixers, valves and centrifugal pumps, include an impeller mounted on a shaft that is driven by a power source, such as an electric motor. The shaft passes through the seal cavity or stuffing box defined by a cylindrical cavity in the device housing. The shaft is supported by bearings at the power end of the device. Seals are placed in the stuffing box to prevent process fluid from passing through the seal cavity and reaching the bearing and a motor, potentially causing damage to both.

In mechanical pumps, the seal cavity restricts passage of chemical fluids or solvents being pumped, many of which are corrosive. Accordingly, it is important that appropriate packing material is placed within the seal cavity. A seal fluid, such as water, is pumped into the seal cavity through a flush port to prevent the fluid being pumped or mixed from travelling along the shaft to the bearings and motor and to provide lubricant to the rotating shaft. Over extended use, the pump shaft may develop a whip as the bearings wear. IN view of this, it may be desirable to provide a sealing system including a bearing to reduce whip that can occur as the shaft rotates, and a lantern ring that provides for increased flush to form an effective seal to limit the amount of product from entering the seal cavity.

There are a wide variety of shaft sealing systems available. One such commercially successful device is described and claimed in Wilkinson, U.S. Pat. No. 6,834,862 for SHAFT SEALING SYSTEM FOR A ROTARY MECHANICAL DEVICE, issued on Dec. 28, 2004. Here, a bearing with an integral lantern ring provides shaft support, and the lantern ring portion allows for addition of flush fluid to the seal cavity. Such bearing elements are custom made for a particular application.

In applications where a separate lantern ring is utilized, one such solution was illustrated earlier in Heinz, U.S. Pat. No. 4,498,681 for UNIVERSAL SEAL CAGE LANTERN RING WITH CHANNELS AND FLUID SLOTS, issued on Feb. 12, 1985. Here, a flexible ring having two ends or lands having an outer groove and an inner groove with spaced holes through the grooves for passage of seal fluid from an external port to the rotating shaft is provided.

When bearings or bushings are installed in stuffing boxes of about 3" in diameter they typically have a one-half inch or greater wall thickness and are force fit into the stuffing box bore. This makes removal after their useful life difficult. Short removal holes are drilled in the top end of the seal elements to allow for inserting a screw or bolt to allow pulling the seal element from the cavity. This works at times, but often a piece of the rigid element merely brakes off making it extremely difficult to remove the remaining part further down into the cavity. By providing at least one jack screw axially through the sidewall facilitates removal by turning the jack screw to press against the inner flange at the bottom of the stuffing box thereby pushing the body out for easier removal rather than trying to pull it out.

SUMMARY OF THE INVENTION

Generally speaking, in accordance with the invention, improved bearing or bushing seal body extraction from a stuffing box using jack screws is provided. The bearing or bushing seal body is provided with at least one jack screw hole axially through the sidewall, preferably one hole on each half of a split body. To remove the seal body, a jack screw is fed axially through the sidewall of the body to the inner flange of the stuffing box to allow of easy removal of the body from the stuffing box by turning the jack screw against the inn flange to lift the body from the stuffing box. A double threaded insert may be screwed into a pocket in the jack screw hole at the bottom end of the body. Turning the jack screw against the inner flange of the stuffing box through the insert against the flange pushes the body out rather than pulling as is typically done today.

The bearing or bushing typically is split to provide easy installation over an installed device shaft. There are at least one or two jack screw holes and up to three or four jack screws per half to provide for ease of removal. The number of screws depends on the overall body and stuffing box dimensions. Preferably, there are two jack screws per half.

In a preferred embodiment of the invention, a double threaded cylindrical insert is screwed into a pocket formed at the bottom of the jack screw hole to facilitate turning the jack screw to push out the body. The pocket has a greater diameter than the jack screw hole with a shoulder to receive the insert to hold the jack screw and push out the body when the jack screw is turned clockwise. The insert has a reverse thread on the outside and a standard thread on the inside allowing the jack screw to pass through. By using a reverse thread on the outside of the insert, the force between the jack screw and the inner diameter of the insert causes the insert to tighten into the body. This easy removal of the body is important when there is a need to inspect and/or replace the body without damaging the seal body or inner bore of the stuffing box.

Accordingly, it is an object of the invention to provide for improved extraction of a bearing or a bushing seal body from the bottom end of a stuffing box of a rotary mechanical device.

It is another object of the invention to provide an improved bearing or a bushing seal body with jack screw holes to facilitate removal from the bottom end of a stuffing box of a rotary mechanical device.

A further object of the invention is to provide an improved bearing or a bushing seal body with cylindrical inserts at the bottom end to receive jack screws to facilitate removal from the bottom end of a stuffing box of a rotary mechanical device.

Yet another object of the invention is to provide an improved bearing or a bushing with double-threaded cylindrical inserts in a pocket at the bottom end of the body to receive jack screws to facilitate removal from the bottom end of a stuffing box of a rotary mechanical device.

Still another object of the invention is to provide an improved method for removal of a bearing or a bushing from the bottom end of a stuffing box of a rotary mechanical device.

Still other objects and advantages of the invention will in part be obvious and will in part be apparent from the specification.

The invention comprises a product possessing the features, properties, and the relation of components and a method which will be exemplified in the product hereinafter described and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
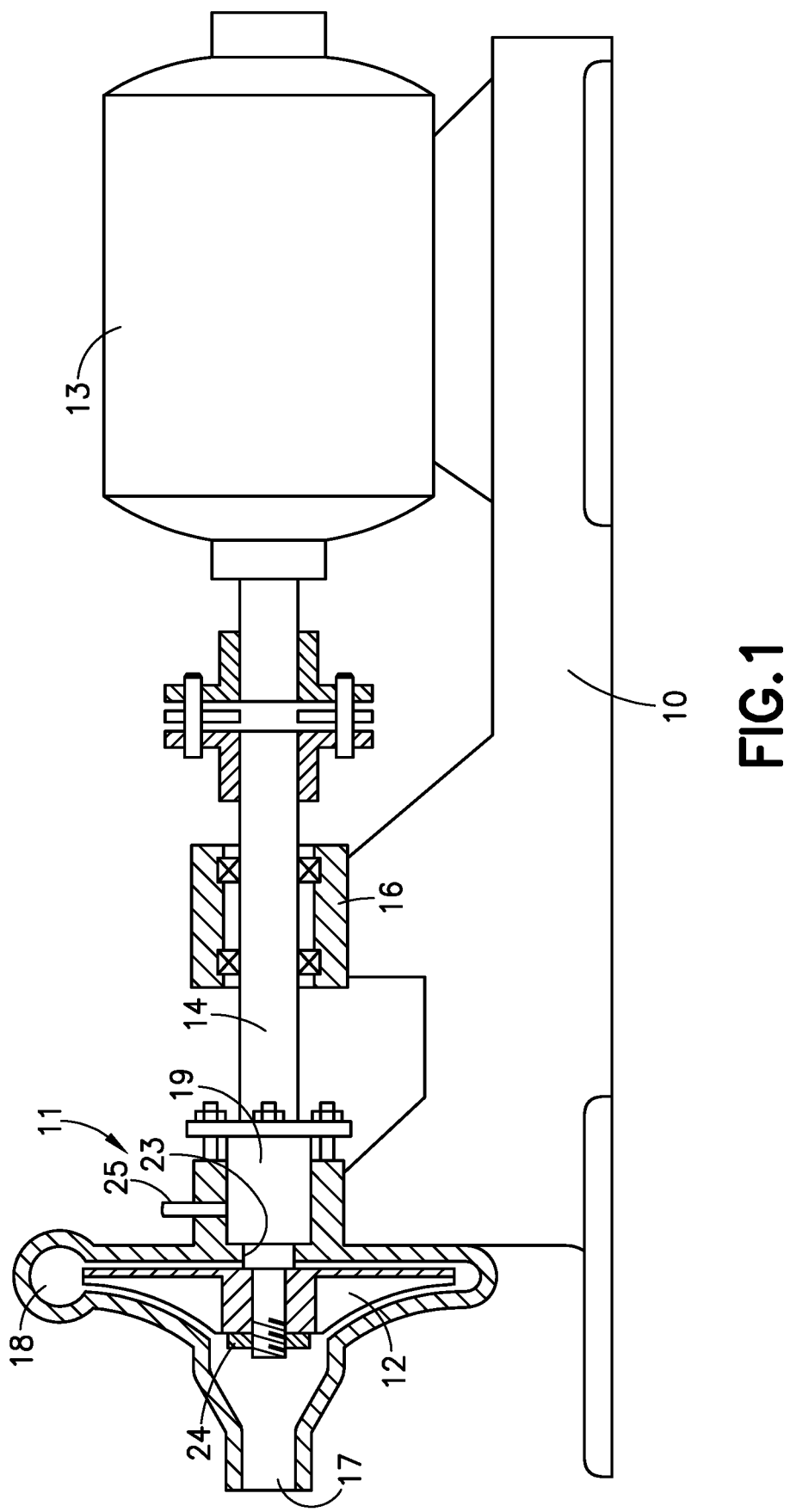
FIG. 1 is a partial cross-sectional view of a typical rotary fluid pump of the type suitable to install a seal system in accordance with the invention.

FIG. 1 illustrates a generic form of a centrifugal pump 11 in cross-section mounted on a frame 10. Pump 11 includes a centrifugal impeller 12 driven by an electric motor 13 that drives a rotary shaft 14 coupled to impeller 12. Shaft 14 is supported by a bearing housing 16 and rotates to draw fluid in through an impeller inlet 17 and expel the fluid out through a radial impeller outlet 18. Pump 11 includes a housing 19 that defines a seal cavity or stuffing box 22 and shaft 14 passing therethrough as shown in detail in FIG. 2. Housing 19 includes an opening 23 through which shaft 14 passes to engage impeller 12 and also includes a flush port 25 for introduction of seal fluid, such as water, into seal cavity 22. Shaft 14 is coupled to impeller 12 by a nut or fastener 24 at the end portion of shaft 14 projecting through impeller 12.

Pump 11 operates by drawing a fluid to be pumped into inlet 17. During pumping, fluid tends to migrate and be forced into seal cavity 22 through opening 23. A wide variety of seals and venting configurations are available to be placed in seal cavity 22 abutting opening 23 in order to restrict and limit entry of pumped fluid into seal cavity 22. If fluid enters seal cavity 22 and migrates to bearing housing 16, the bearings will be subject to substantial degradation due to the corrosive action of the pumped fluid.

Figure 2:
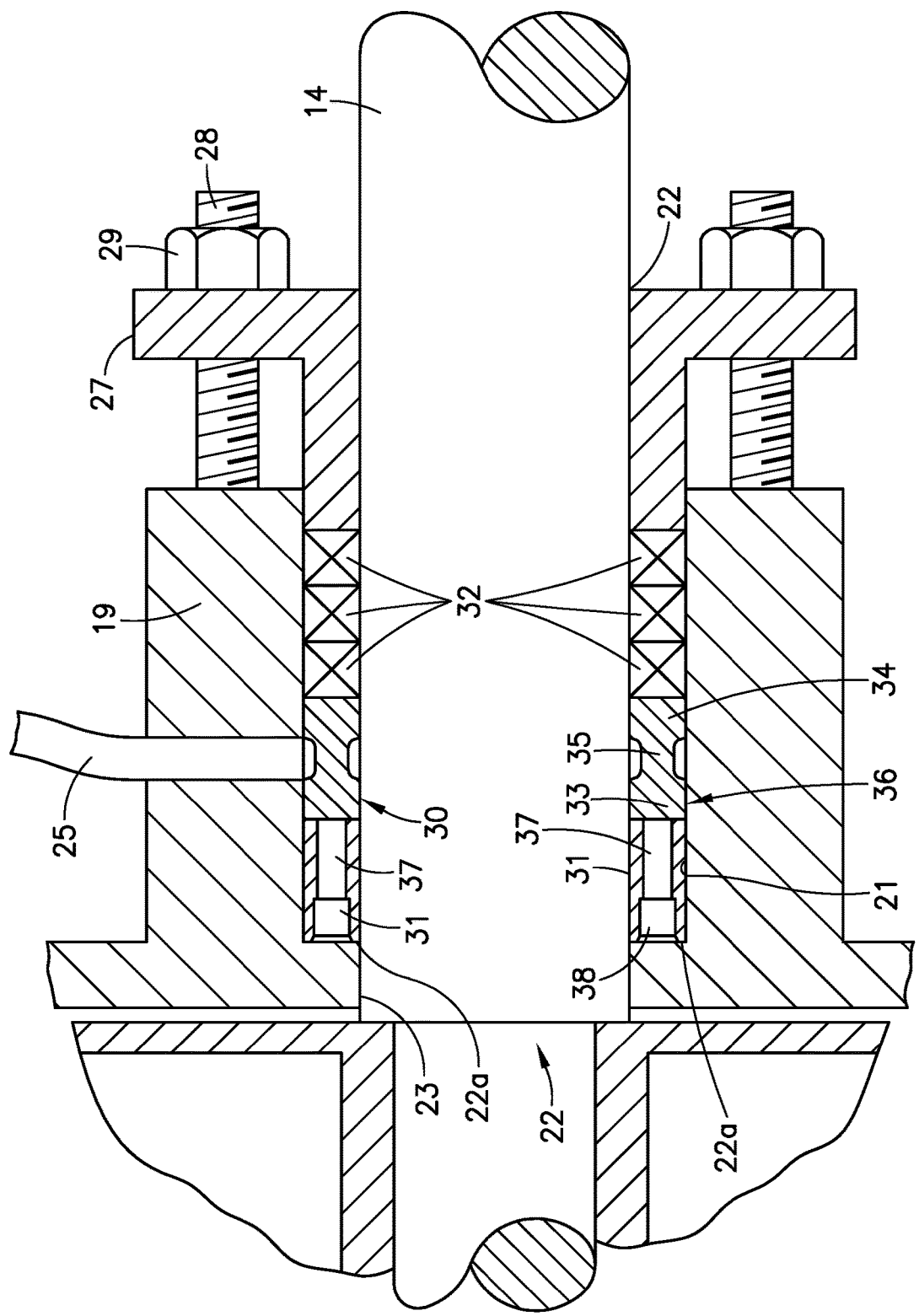
FIG. 2 is a cross-sectional view of the seal cavity of the pump of FIG. 1 with a shaft sealing system including a rigid seal element with jack screw hole and inserts, a lantern ring and packing in accordance with the invention.

FIG. 2 is an enlarged sectional view of seal cavity 22 with a shaft sealing system in accordance with the invention in place. Seal cavity 22 is defined radially by an inner bore 21 and the diameter of shaft 14. The motor end of seal cavity 22 is defined by a gland follower 27 mounted on gland bolts 28 and secured in place by gland nuts 29.

As shown in FIG. 2, the shaft sealing system installed in seal cavity 22 includes a bearing or bushing seal element 31 positioned against the lower or impeller end of seal cavity 22 with a lantern ring 30 positioned on the motor side of seal element 31. Seal element 31 is fabricated to include at least one and up to about six jack screw holes 37 running from the top of seal element 31 to the bottom end thereof. After fabrication, seal element 31 is split for easy instillation over a mounted shaft. Each half will have at least one and generally two or three jack screw holes 37.

Jack screw holes 37 are formed with a jack screw pocket 38 at the bottom end having a diameter greater than jack screw hole 37 to form a pocket with a shoulder 38 a to receive a jack screw insert 39 is installed facing an internal flange 22a in stuffing box 22. In this case, each half of seal element 31 includes two jack screw holes 37. The sealing elements in seal cavity 22 include at least one compressible packing ring 32, preferably three as shown, and gland follower 27. Lantern ring 30 is positioned at fluid flush port 25. Various types of packing rings suitable for use are shown in U.S. Pat. Nos. 5,370,926, 4,559,862, 4,431,698, 4,371,180 and 4,298,207, the contents of which are incorporated by reference in their entirety.

Figure 3:
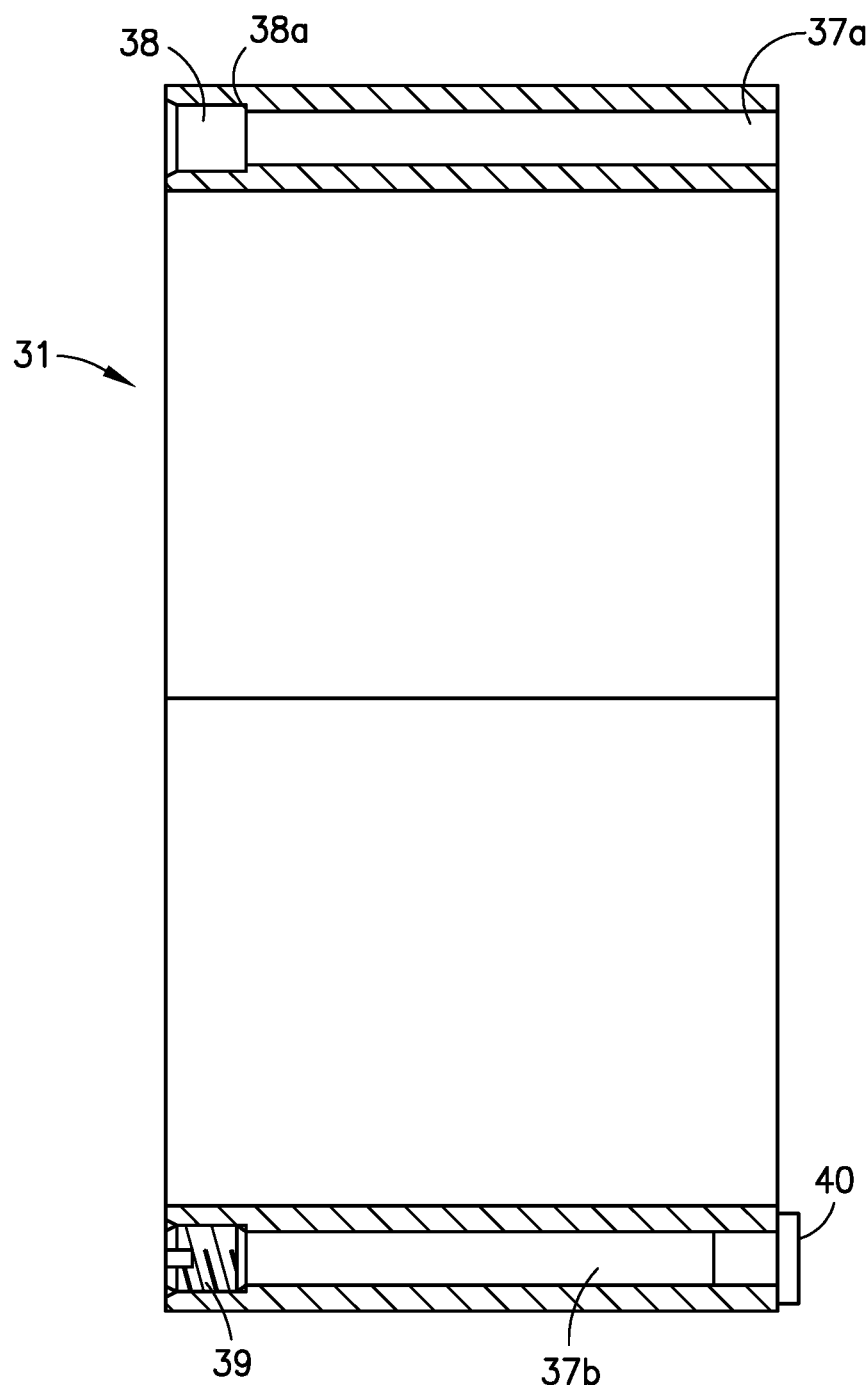
FIG. 3 is an cross-sectional view of the seal element positioned in the bottom end of the seal cavity of the pump of FIG. 2 showing the pocket in the bottom of one jack screw hole and a rigid seal element in place in another pocket in accordance with the invention.
Figure 4:
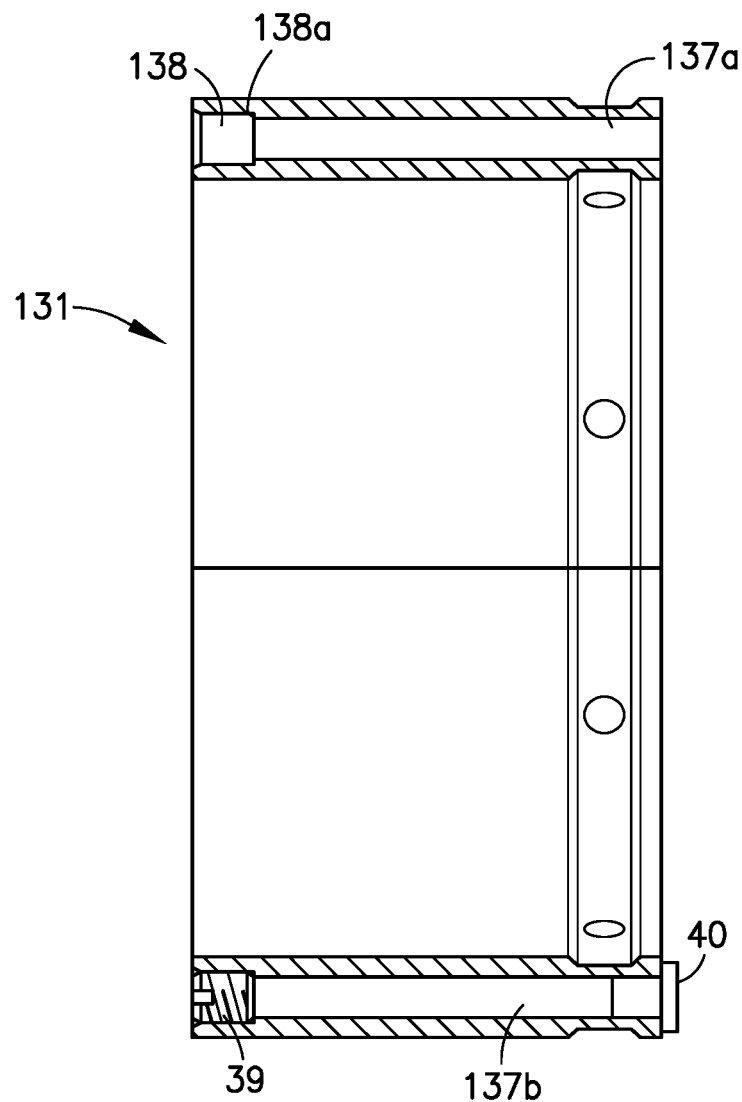
FIG. 4 is a cross-sectional view of a seal element having an integral lantern ring suitable for use with the pump of FIG. 2 also showing the pocket in the bottom of one jack screw hole and a rigid seal element in place in another pocket in accordance with the invention.

FIG. 3 is a cross-sectional sectional view of a substantially rigid bearing or bushing seal element 31 showing a first jack screw hole 37a with a pocket 38 and a second jack screw holes 37b having jack screw insert 39 in pocket against shoulder 38a. Similarly, FIG. 4 is a cross-sectional view of a substantially rigid bearing or bushing seal element 131 with an integral lantern ring as described in U.S. Pat. No. 6,834,862. As shown in FIG. 3, FIG. 4 also shows a first jack screw hole 137a with a pocket 138 and a second jack screw hole 137b having jack screw insert 39 in pocket against shoulder 138a.

It is also within the scope of the invention to provide a cover or plug 40 fitted in or over jack screw holes 37 at the top end on element 31 when installed in a stuffing box. This plug or covering 40, such as a cylindrical silicone plug with a thin cap or flange, or a PTFE tape closes jack screw hole 37 to entry of process fluid into jack screw hole during use. If entry of process fluid is prevented, it will be easier to install jack screws 36 when it is time to remove element 22 from seal cavity 22. Alternatively, when no closure is used it is anticipated that packing ring 32 adjacent to seal element 31 will be pushed into jack screw hole 37 and limit entry of process fluid as gland follower 27 is tightened during use.

Figure 5:
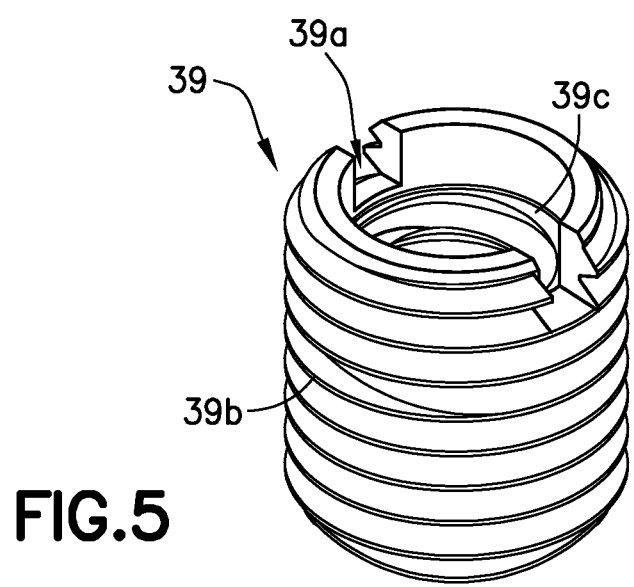
FIG. 5 is a perspective view of the of a jack screw insert in a seal element as shown in FIGS. 2-4.

FIG. 5 is a perspective view of jack screw insert 39 that is inserted into the bottom end of jack screw holes 37 in bearing or bushing seal element 31 as shown in FIGS. 2 and 3. Inserts 39 are cylindrical with a screw slot 39a and are sized to receive a jack screws 36 as described below. Insert 39 has external threads 39b to allow it to be secured in holes 37 in element 31 and 13 land an internal reverse thread 39c that will receive jack screw 36. This configuration will allow jack screw 38 when turned to push against internal flange 22a of seal cavity 22 when removing seal element 31 from seal cavity 22.

Figure 6:
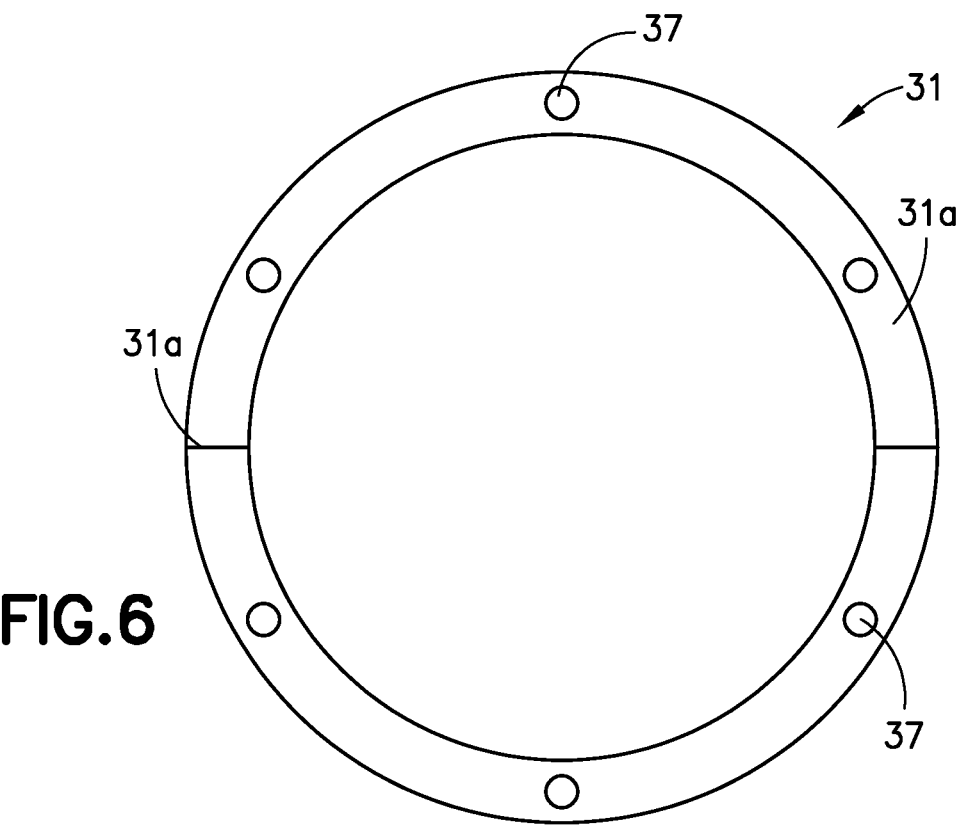
FIG. 6 is a top plan view of a rigid stuffing box body of FIGS. 2-4 showing six jack screw holes on the top of the body.
Figure 7:
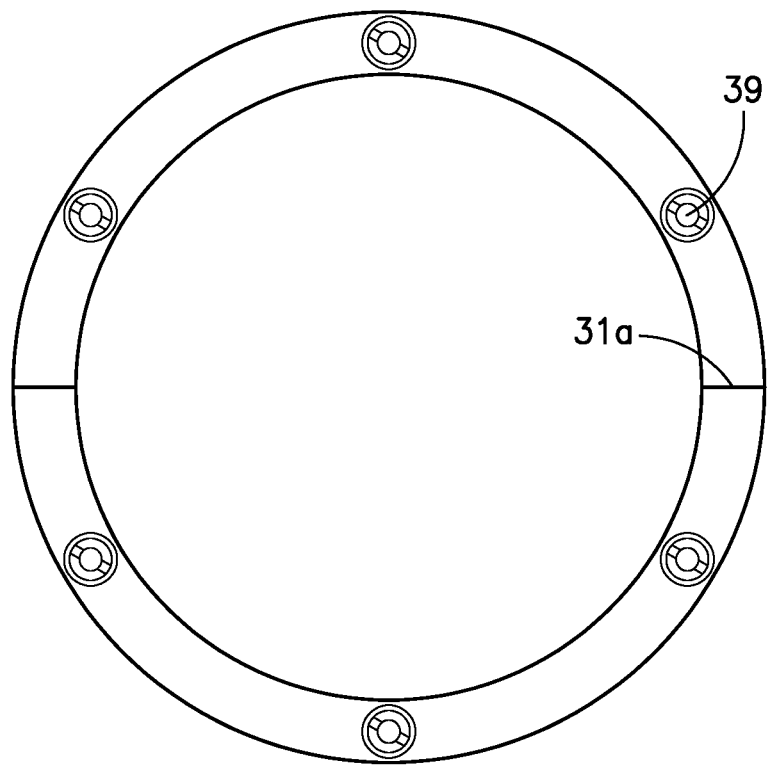
FIG. 7 is a bottom plan view of a rigid stuffing box body of FIGS. 2 and 3 with jack screw inserts in place in the bottom end of jack screw holes.
Figure 8:
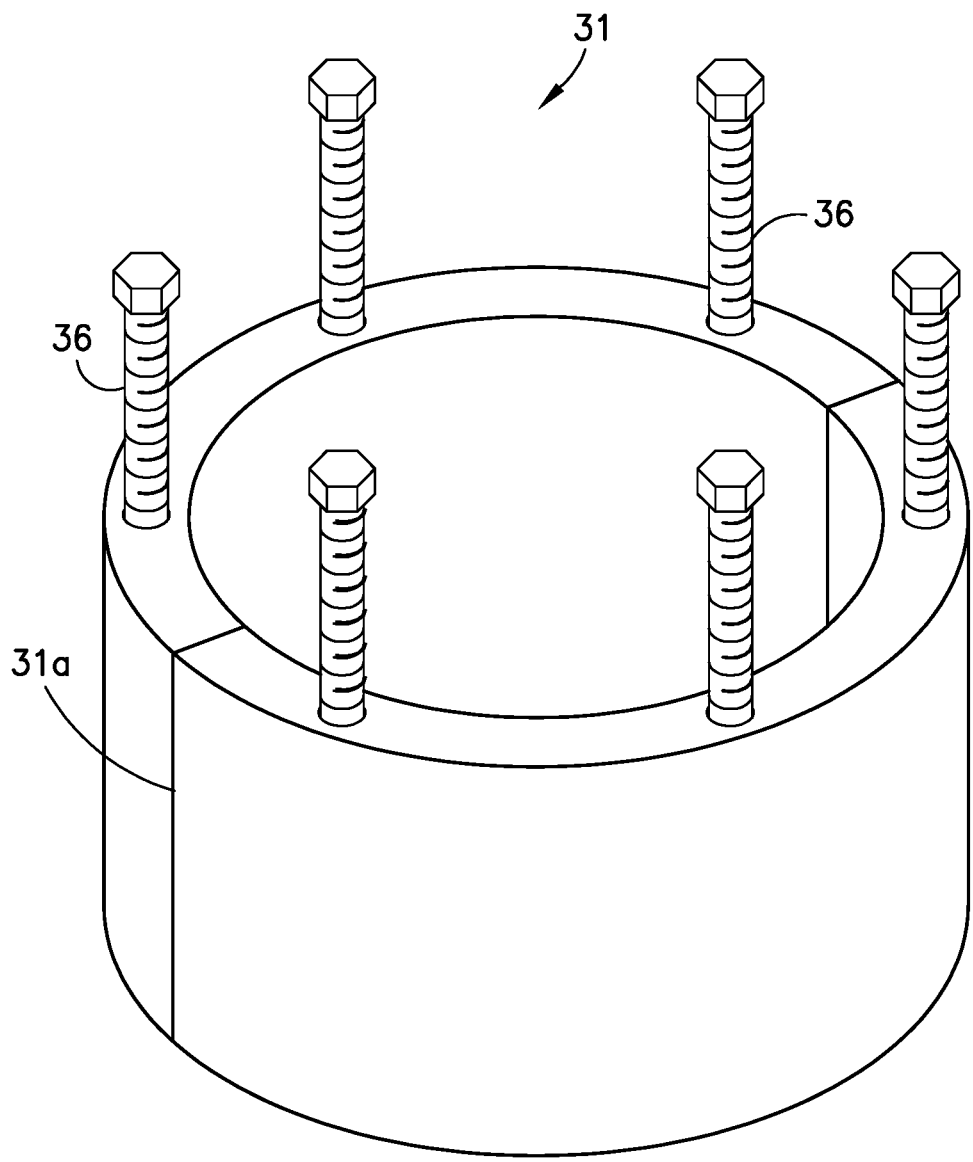
FIG. 8 is a perspective view of the rigid stuffing box body with jack screws installed and ready for removal in accordance with the invention.
Figure 9:
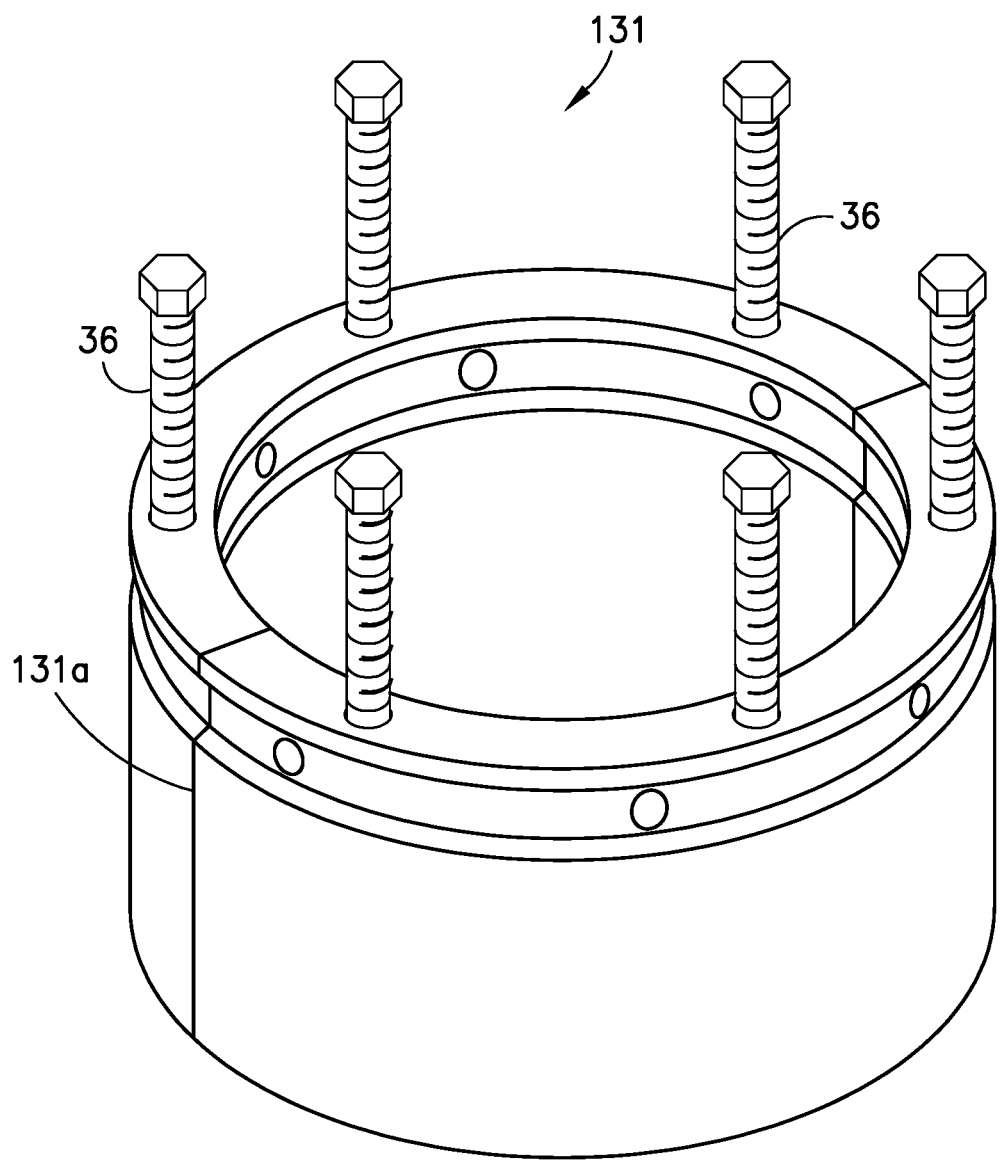
FIG. 9 is a perspective view of the rigid stuffing box body with integral lantern ring with jack screws installed and ready for removal in accordance with the invention.

FIG. 6 is a top plan view of both seal elements 31 and 131 with only reference numbers for element 31. Similarly, FIG. 7 is a bottom plan view of both seal elements 31 and 131 showing inserts 38 with screw slot 39a in place. Both seal elements 31 and 131 are split along a split line 31a or 131a to facilitate installation over an installed shaft.

In the illustrated embodiments seal elements 31 and 131 include six jack screw holes 37. Seal element s 31 and 131 have a wall thickness of at least about 0.50 inch and thicker. This will accommodate jack screw holes 37 of about 0.25 inch without weakening seal element 31 that may include anywhere between one and four or six holes 37 depending on the size and wall thickness of seal elements 31 and 131. The larger the size, the more holes that may be necessary to facilitate removal. Similarly, the greater the wall thickness, larger jack screw holes 37 and screws 36 may be used if desired.

Seal element 31 is a substantially cylindrical rigid member with an outer surface closely dimensioned to inner bore 21 of pump housing 19. When formed of bearing grade material and formed with close tolerances seal element 31 provides a bearing surface for shaft 14 when in position as shown in FIG. 2, and this is custom dimensioned for a particular mechanical device.

Seal element 31 and lantern ring 32 and element 131 are substantially rigid and formed of materials that will not be attacked or destroyed by corrosive fluids being transported by pump 11. Preferred materials of construction include non-ferrous materials, molybdenum/carbon or glass or carbon filled thermoplastic material, such as nylon, polytetrafluoroethylene (PTFE), or any other suitable plastic material that will not be degraded by the materials in the device or the temperatures encountered. Materials are selected that can provide a suitable bearing surface and are resistant to most industrial solutions.

Materials are selected that can provide a suitable bearing surface and are resistant to most industrial solutions. Suitable bearing materials are those that provide suitable chemical, temperature, compressive strength, flexural strength and wear characteristics and can be appropriately machined to yield the desired bearing dimensions and tolerances. Such bearing materials include, but are not limited to, polymers, including polyphenylene sulfides, polyimidizoles, polyamideimides, polybenzylimidizoles, PEEK polymers obtained by step-growth polymerization by the dialkylation of bis-phenolate salts, PTFE, perfluoroalkoxy, and formulations containing these polymers in a major proportion.

Seal elements 31 and 131 in accordance with the invention are bearings or bushings usually is manufactured by machining a molded hollow cylinder of suitable material to size, molding, or by additive manufacturing techniques. These latter techniques include 3D Printing, Rapid Prototyping (RP), Direct Digital Manufacturing (DDM), layered manufacturing and additive fabrication. In this process, 3D objects are built by adding layer-upon-layer of material, whether plastic, neat or filled, and metal.

In order to install seal element 31 and lantern ring 30 or element 131 in position in seal cavity 22, seal element 31 and lantern ring 30 and element 131 are split along a center line 31a and 30a, or 131a, respectively. Splitting seal element 31 lantern ring 30 and seal element 131 allows them to be placed about installed shaft 14 and pushed into position at the impeller end of seal cavity 22. Generally, at least one, and preferably three, packing rings 32 are positioned on the gland side of lantern ring 32.

The following Example is set forth by way of illustration to help explain the invention and is not intended to be limiting in any way.

Example 1

A bearing seal element prepared for the stuffing box of a device with a 6.0-inch bore and a 5.0-inch diameter shaft typically will have a radial width per side of 0.500 inch. The overall height is 3.0-inch. Each half of the bearing has three jack screw holes. Each jack screw hole is 0.257-inch with a shoulder at the bottom end formed by a 0.332 diameter hole 0.40-inch deep for receiving a screw insert. The jack screws are self-threading and are 0.375-inch and about 6-inch in length but can be longer depending on the depth of the stuffing box.

In this embodiment, jack screw insert is 0.38-inch long with an outer ⅜-24 left hand thread and a standard ¼-20 internal thread. A 0.06-inch screw slot 0.06 deep is formed on the bottom side. After the screw hole and pocket are formed, insert is threaded into pocket prior to installation of the bearing in stuffing box. Alternatively, a single threaded insert can be press fit into the pocket.

Packing materials are described in the aforementioned U.S. Pat. Nos. 4,298,207, 4,371,180, 4,431,698, 4,559,862, and 5,370,926, the contents of each of which are incorporated herein by reference in their entirety. More particularly, useful materials include, but are not limited to, mechanically and/or thermally resilient component of graphite tape, expanded graphite foil, graphite fiber, carbon fiber, polybenzimidazole (PBI) fiber, PEK fiber, PEEK fiber, PFA fiber, aromatic polyamide fiber, Inconel or Monel wire, or combinations thereof. In another aspect of the invention, the at least one packing member is a material selected from the group consisting of carbonized yarns, graphitized yarns, exfoliated graphite yarns, ceramic yarns, and glass yarns. Tension or lip seal rings may comprise the same or different components of the same or different components. The packing rings or members may comprise mechanical and/or thermal components, whether individually or by combinations thereof, i.e., corner yarns, resilient core, etc. The designs and materials are chosen to resist packing consolidation.

Braided packing rings may include fibers of flax, jute, asbestos, or a synthetic material, such as polytetrafluoroethylene, which fibers are formed into yarns or strands and which are braided together about core strands. The result is typically a packing having a square cross-section and herringbone weave pattern extending in an axial direction along the packing. Typical packing members are illustrated in U.S. Pat. No. 3,646,846, incorporated herein by reference.

Due to the close tolerances available, improved support of the impeller is assured, resulting in longer life of the main bearings and packing materials as well as reduced wear of the throat of the rotary device. Minimum seal water is required with less product contamination because of this throttling effect. Minimum external leakage also results from the installation of the sealing system constructed and arranged in accordance with the invention.

It will thus be seen that the object set forth above, among those made apparent from the preceding description are efficiently attained and, since certain changes may be made in the device set forth without departing from the spirit and scope of the invention, it is intended that all matter contained in the above description and shown in the accompanying drawings shall be interpreted as illustrative and not in a limiting sense. Each split half has a three jack screw holes with inserts and when installed and mated with a second half yields a fully functional bearing to reduce shaft movement.

It is also to be understood that the following claims are intended to cover all of the generic and specific features of the invention herein described and all statements of the scope of the invention, which, as a matter of language, may be said to fall there between.

What is claimed is:

1. A bearing or bushing seal body for installation into a stuffing box of a mechanical device, the stuffing box having an inner bore and a shaft therethrough, wherein the bearing or bushing seal body comprises:
   a substantially rigid cylindrical body having a sidewall with an outer surface closely dimensioned to the inner bore and formed with close tolerances to the shaft and having at least one axial jack screw hole formed axially through the sidewall of the substantially rigid cylindrical body for receiving a jack screw; and
   a double threaded insert in the bottom wall of the substantially rigid cylindrical body, with a reverse external thread and standard internal thread.

2. The bearing or bushing seal body of claim 1, wherein the substantially rigid cylindrical body is split axially into two halves to facilitate installation over the shaft.

3. The bearing or bushing seal body of claim 2, wherein the split substantially rigid cylindrical body comprises at least two jack screw holes and wherein the split substantially rigid cylindrical body is split axially between the at least two equally spaced jack screw holes.

4. The bearing or bushing seal body of claim 1, wherein the substantially rigid cylindrical body is formed of a non-ferrous metal material.

5. The bearing or bushing seal body of claim 1, wherein the substantially rigid cylindrical body is formed from a thermoplastic material.

6. The bearing or bushing seal body of claim 5, wherein the thermoplastic material is filled with at least one of carbon, glass and mixtures thereof.

7. The bearing or bushing seal body of claim 1, further including a plug fitted over the at least one axial jack screw hole at a top of the substantially rigid cylindrical body.

8. The bearing or bushing seal body of claim 3, wherein each of the split halves of the split substantially rigid cylindrical body has three jack screw holes through the sidewall of the substantially rigid cylindrical body.

9. The bearing or bushing seal body of claim 1, wherein the substantially rigid cylindrical body is formed with an integrally formed lantern ring.

10. The bearing or bushing seal body of claim 3, wherein the substantially rigid cylindrical body includes an integrally formed lantern ring.

11. An improved extraction method for removing a bearing or bushing seal body as claimed in claim 1 from a stuffing box having an inner flange at the bottom end, comprising:
   threading a jack screw through the at least one axial jack screw hole and against an inner flange of the stuffing box to lift the bearing or bushing seal body from the stuffing box.

12. The method of claim 11, comprising:
   inserting a double threaded insert into a bottom wall of the bearing or bushing seal body so that the bearing or bushing seal body may be installed flush against the inner flange; and
   threading the jack screw through the insert.

13. A bearing or bushing seal body for installation into a stuffing box of a mechanical device, the stuffing box having an inner bore and a shaft therethrough, wherein the bearing or bushing seal body comprises:
   a substantially rigid cylindrical body having a sidewall with an outer surface closely dimensioned to the inner bore of the stuffing box and formed with close tolerances to the shaft, wherein the substantially rigid cylindrical body is split axially into two halves to facilitate installation over the shaft;
   wherein each of the two halves of the split substantially rigid cylindrical body have at least two jack screw holes through the sidewall of the substantially rigid cylindrical body, wherein each of the jack screw holes are for receiving a respective jack screw; and
   wherein the substantially rigid cylindrical body is split axially through at least two equally spaced jack screw holes.

14. An improved extraction method for removing a bearing or bushing seal body from a stuffing box of a mechanical device, the stuffing box having an inner bore and a shaft therethrough, wherein the stuffing box comprises an inner flange at a bottom end thereof, wherein the bearing or bushing seal body comprises a substantially rigid cylindrical body having a sidewall with an outer surface closely dimensioned to the inner bore and formed with close tolerances to the shaft and having at least one axial jack screw hole formed axially through the sidewall of the substantially rigid cylindrical body for receiving a jack screw; wherein the method comprises the steps of:
   threading a jack screw through the at least one axial jack screw hole and against an inner flange of the stuffing box; and
   lifting the bearing or bushing seal body from the stuffing box.

* * * * *